United States Patent
Hoekstra et al.

(10) Patent No.: US 9,006,318 B2
(45) Date of Patent: Apr. 14, 2015

(54) FLAME-RETARDANT POLYAMIDE COMPOSITION

(75) Inventors: Johannes Hoekstra, Helmond (NL); Jeroen Joost Crevecoeur, Maastricht (NL); Jin Ye, Shanghai (CN)

(73) Assignee: DSM IP Assets B.V., Heerlen (NL)

( * ) Notice: Subject to any disclaimer, the term of this patent is extended or adjusted under 35 U.S.C. 154(b) by 411 days.

(21) Appl. No.: 13/003,367

(22) PCT Filed: Jul. 8, 2009

(86) PCT No.: PCT/EP2009/058675
§ 371 (c)(1),
(2), (4) Date: May 12, 2011

(87) PCT Pub. No.: WO2010/003981
PCT Pub. Date: Jan. 14, 2010

(65) Prior Publication Data
US 2011/0207862 A1  Aug. 25, 2011

(30) Foreign Application Priority Data
Jul. 10, 2008  (EP) .................................... 08160105

(51) Int. Cl.
*C08K 5/34* (2006.01)
*C08K 5/3477* (2006.01)
*C08K 5/3492* (2006.01)
*C08K 5/53* (2006.01)
*B29C 33/60* (2006.01)
*A01J 21/00* (2006.01)
*C08K 3/34* (2006.01)

(52) U.S. Cl.
CPC .............. *C08K 5/34928* (2013.01); *C08K 3/34* (2013.01)

(58) Field of Classification Search
CPC ............. C08K 5/3477; C08K 5/34924; C08K 5/34928
USPC .................. 524/101, 451, 100, 126, 229, 606; 525/424; 425/375
See application file for complete search history.

(56) References Cited

FOREIGN PATENT DOCUMENTS

| JP | 54113647 | * | 9/1979 | ............ C08L 77/00 |
| JP | 59-149955 |   | 8/1984 |   |
| JP | 59149955 | A * | 8/1984 | ............ C08L 77/00 |
| JP | 62000548 | * | 1/1987 | ............ C08L 77/00 |

OTHER PUBLICATIONS

Human English translation of JP 59149955, Kawasaki et al, Aug. 1984.*
English Translation of Japanese Patent, JP62000548, Inventor Toshio Shimada, Jan. 6, 1987, Translation Date, Sep. 2012, USPTO.*
Database Chemical Abstract Service: "Fire Resistant Polyamide Compositions", by Tsutomu Tamura, Abstract JP54113647, Sep. 5, 1979.*
International Search Report for PCT/EP2009/058675, mailed Sep. 4, 2009.
Written Opinion of the International Searching Authority for PCT/EP2009/058675, mailed Sep. 4, 2009.
Database CA [Online], Chemical Abstracts, Tamura et al., "Fire-Resistant Polyamide Compositions", Accession No. 1980:77448, (Sep. 5, 1979), 2 pages.
Database CA [Online], Chemical Abstracts, Yanagimoto et al., "Fire-Resistant Polyamide Compositions", Accession No. 1979:405930, (Feb. 7, 1979), 2 pages.

* cited by examiner

*Primary Examiner* — Susannah Chung
*Assistant Examiner* — Atnaf Admasu
(74) *Attorney, Agent, or Firm* — Nixon & Vanderhye P.C.

(57) ABSTRACT

The present invention relates to a polyamide composition comprising (amounts are based on the total composition) (A) polyamide, (B) melamine cyanurate and (C) talcum as mineral filler wherein the amount of talcum is higher than 25 wt %, and the weight ratio melamine cyanurate/talcum is higher than ⅓ and to articles made wholly or partly of this polyamide composition. The polyamide is preferably polyamide 6. The composition is commonly used in the industry of for instance electrical and electronic parts and preferably in miniature circuit breakers.

8 Claims, No Drawings

FLAME-RETARDANT POLYAMIDE COMPOSITION

This application is the U.S. national phase of International Application No. PCT/EP2009/058675, filed 8 Jul. 2009, which designated the U.S. and claims priority to EP Application No. 08160105.6, filed 10 Jul. 2008, the entire contents of each of which are hereby incorporated by reference.

The present invention relates to a polyamide composition comprising (amounts are based on the total composition)
(A) polyamide,
(B) melamine cyanurate and
(C) talcum as mineral filler.

The present invention also relates to articles made wholly or partly of the polyamide according to the invention.

The presence of mineral fillers in polyamide composition has certain benefits, such as enhanced stiffness, decreased mold shrinkage and increased creep resistance, but also a number of disadvantages, such as decreased ductility and toughness and increased melt viscosity (see for example Melvin I. Kohan, Nylon Plastics Handbook, 1995, Carl Hanser Verlag, page 388). In addition, adding mineral filler to polyamide is economically advantageous as it can reduce the cost price of the polyamide composition. The price of mineral fillers typically used for reinforcement, is lower than that of polyamide. In view of this, there is a desire to increase the amount of mineral filler.

In many applications it is necessary to add materials to the composition which will impart flame retardance to the molded article. However, it is known that highly filled thermoplastic compounds can be more difficult to flame retard compared to the corresponding unfilled compounds (see U.S. Pat. No. 5,674,931, column 1, lines 49 and further). Melamine cyanurate is known for its good flame-retardant properties, while being halogen-free (see for example Melvin I. Kohan, Nylon Plastics Handbook, 1995, Carl Hanser Verlag, page 435).

Flame retardancy can be measured in various ways, of which the glow wire flammability index test (hereafter referred to as GWFI-test) is commonly used in the industry of for instance electrical and electronic parts. The GWFI-test can be measured at various temperatures, of which 960° C. is the most stringent criterion. Miniature circuit breakers, for instance, have to comply to the GWFI-test at this temperature. The test measures the ability to extinguish a flame caused by the application of a glow wire according to standard IEC 60695-2-12 to test specimens with a given thickness and a surface area of at least 60×60 mm at a preset temperature of the glow wire. The composition passes the test when either there is no ignition of the specimen or when the there is ignition but it self extinguishes within 30 s after removal of the said glow wire. The composition passes the test at a certain temperature if, by successive testing, three different specimens self extinguish within 30 s after removal of said glow wire or do not ignite at all.

Another method to evaluate flame retardancy is to record burning times between the start of applying a glow wire at a certain temperature and the moment the flame self-extinguishes. It should be understood that the burning time may be shorter than the application time of the glow wire. This method allows for a more quantitative evaluation compared to the GWFI-test, as the GWFI-test is a pass/no-pass-test.

Compositions comprising a mineral filler and melamine cyanurate are known. JP60037829B2 describes a flame-retardant polyamide composition which comprises 3-30% by weight of melamine cyanurate based on the polyamide weight and 5-60% by weight of an inorganic filler, such as talcum, in which the weight ratio of melamine cyanurate/inorganic filler is adjusted between $\frac{1}{5}$ and $\frac{1}{3}$. The exemplified compositions all have an amount of inorganic filler of 30 wt % and 10 wt % of melamine cyanurate, based on the polyamide weight (this corresponds to 21.4 wt % inorganic filler and 7.1 wt % melamine cyanurate, based on the total amount of the composition). A drawback of the known polyamide compositions is that the amount of inorganic filler is limited.

The object of the present invention is to provide for polyamide compositions with increased amounts of talcum which still have acceptable burning times. Acceptable burning times in the present invention are considered to be present when the GWFI-test at 960° C. is successfully passed.

It has been found that when amounts of talcum of 25 wt % are used in a polyamide composition, an increase in the amount of melamine cyanurate to such extent that the weight ratio melamine cyanurate over talcum is higher than $\frac{1}{3}$, does not result in substantially shorter burning times.

It has now surprisingly been found that when amounts of talcum of more than 25 or at least 26, 27, 28, 29 or 30 wt % (based on the total amount of composition) are employed and the weight ratio melamine cyanurate/talcum is higher than $\frac{1}{3}$, a profitable reduction of the burning times of the compositions is observed, in particular that the GWFI-test at 960° C. is passed.

Using an amount of melamine cyanurate and talcum higher than 50 wt %, based on the total amount of composition, may result in unacceptable mechanical properties, in particular elongation at break.

The polyamide in this invention is any suitable polyamide, of which polyamide 6 or polyamide 6,6 are preferred and polyamide 6 is most preferred. The polyamide has preferably an amino/carboxyl ratio of less than 1.5, which has a positive effect on the stability of the melt viscosity of the polyamide.

The polyamide composition is preferably substantively free of $Mg(OH)_2$, which means in the present case that less than 0.5 wt % of $Mg(OH)_2$, based on the total amount of composition, is present in the composition.

The polyamide composition is preferably halogen-free.

The polyamide composition may comprise additives in an amount from 0 up to and including 6 wt %, based on the total amount of composition. Additives include for example pigments, release agents, and stabilizers.

The present invention also relates to articles made wholly or partly of the polyamide composition according to the invention. All known techniques for the preparation of the articles from the polymer composition can be used, in particular injection molding is suitable. The invention also relates to articles, for example electrical and electronic parts, comprising the polymer composition according to the invention. The polyamide composition according to the invention is preferably applied in miniature circuit breakers.

The compositions can be obtained by mixing the components by any known method. For instance the components may be dry blended and consequently fed into a melt mixing apparatus, preferably an extruder. Also the components can be directly fed into a melt mixing apparatus and dosed together or separately. Preference is given to an extruder as melt mixing apparatus. In that case the composition is obtained in pellets that can be used for further processing, for instance in injection molding. Preferably the melt mixing is performed in an inert gas atmosphere and the materials are dried before mixing.

In a preferred embodiment, the polyamide and melamine cyanurate are fed into the extruder via the throat and at least a part, preferably the total amount of talcum, is fed to the melt comprising at least the polyamide and melamine cyanurate.

Feeding at least a part of the amount of talcum to the melt of the polyamide and melamine cyanurate is advantageous as this allows higher production speeds.

Any commercially available melamine cyanurate, preferably in powder form, can be used.

The invention will now be further elucidated with reference to the following examples and comparative examples. All weight percentages are based on the weight of the total composition, unless specified otherwise. The polyamide used in all examples was poly-ε-caprolactam with a relative solution viscosity of 2.20+−0.2 (90% HCOOH, 1 g/100 ml) in all examples. The thickness of all tested specimens was 1 mm and the surface area was 80×80 mm.

EXAMPLE 1

A composition comprising of polyamide with 30 wt % talcum (Yongmao talc powder, 400 MU, produced by Shandong Laizhou Yongmao), 11 wt % melamine cyanurate (Sichuan MeCy from Sichuan Fine Chemical inst), release agent, polymer stabilizer and colorants was produced on a Berstorff ZE25 co-rotating twin screw extruder. The composition has a melamine cyanurate to talcum weight ratio of 0.36. The composition was used to injection-mold specimen with dimensions of 80×80×1 mm. These specimen were subjected to GWFI testing according to IEC 60695-2-12. The test was repeated in ten-fold with the glow wire at 960° C. At this temperature all specimen ignited and self-extinguished in less than 5 s after removal of the glow wire. This composition thus passed the GWFI 960 test.

EXAMPLE 2

A composition comprising of polyamide with 30 wt % talcum (Yongmao talc powder, 400 MU, produced by Shandong Laizhou Yongmao), 12.5 wt % melamine cyanurate (Sichuan MeCy from Sichuan Fine Chemical inst), release agent, polymer stabilizer and colorants was produced on a Berstorff ZE25 co-rotating twin screw extruder. The composition has a melamine cyanurate to talcum weight ratio of 0.42. The composition was used to injection-mold specimen with dimensions of 80×80×1 mm. These specimen were subjected to GWFI testing according to IEC 60695-2-12. The test was repeated in ten-fold with the glow wire at 960° C. At this temperature all specimen self-extinguished in less than 5 s after removal of the glow wire. This composition thus passed the GWFI 960 test.

COMPARATIVE EXAMPLE 1

A composition comprising of polyamide with 20 wt % talcum (Yongmao talc powder, 400 MU, produced by Shandong Laizhou Yongmao), 5 wt % melamine cyanurate (Sichuan MeCy from Sichuan Fine Chemical inst), release agent, polymer stabilizer and colorants was produced on a Berstorff ZE25 co-rotating twin screw extruder. The composition has a melamine cyanurate to talcum weight ratio of 0.25. The composition was used to injection-mold specimen with dimensions of 80×80×1 mm. These specimen were subjected to GWFI testing according to IEC 60695-2-12. The test was repeated in ten-fold with the glow wire at 960° C. At this temperature all specimen ignited and self-extinguished after more than 30 s after removal of the glow wire. This composition thus failed the GWFI 960 test.

COMPARATIVE EXAMPLE 2

A composition comprising of polyamide with 38 wt % talcum (Yongmao talc powder, 400 MU, produced by Shandong Laizhou Yongmao), 8.75 wt % melamine cyanurate (Sichuan MeCy from Sichuan Fine Chemical inst), release agent, polymer stabilizer and colorants was produced on a Berstorff ZE25 co-rotating twin screw extruder. The composition has a melamine cyanurate to talcum weight ratio of 0.23. The composition was used to injection-mold specimen with dimensions of 80×80×1 mm. These specimen were subjected to GWFI testing according to IEC 60695-2-12. The test was repeated in ten-fold with the glow wire at 960° C. At this temperature all specimen ignited and self-extinguished after more than 30 s after removal of the glow wire. This composition thus failed the GWFI 960 test.

COMPARATIVE EXAMPLE 3

A composition comprising of polyamide with 30 wt % talcum (Yongmao talc powder, 400 MU, produced by Shandong Laizhou Yonmgao), 9.5 wt % melamine cyanurate (Sichuan MeCy from Sichuan Fine Chemical inst), release agent, polymer stabilizer and colorants was produced on a Berstorff ZE25 co-rotating twin screw extruder. The composition has a melamine cyanurate to talcum weight ratio of 0.32. The composition was used to injection-mold specimen with dimensions of 80×80×1 mm. These specimen were subjected to GWFI testing according to IEC 60695-2-12. The test was repeated in ten-fold with the glow wire at 960° C. At this temperature all specimen ignited and self-extinguished after more than 30 s after removal of the glow wire. This composition thus failed the GWFI 960 test.

This comparative example shows that increasing the mineral filler to 30 wt %, based on the total composition, leads to failure of the GWFI-test, when the melamine cyanurate/talcum weight ratio is less than ⅓.

COMPARATIVE EXAMPLE 4

A composition comprising of polyamide with 25 wt % talcum (Stealene B from Lunzenac) and various amounts of melamine cyanurate (Melapur® MCXL from Ciba), release agent and polymer stabilizer were produced on a Berstorff ZE25 co-rotating twin screw extruder. The compositions have a melamine cyanurate to talcum weight ratio ranging from 0.3 to 0.6. The composition was used to injection-mould specimen with dimensions of 80×80×1 mm. These specimens were subjected to GWFI testing according to IEC 60695-2-12. The test was repeated in ten-fold with the glow wire at 960° C. In these experiments the application time of the glow wire was 30 seconds. At this temperature all specimen ignited. Resulting burning times are presented in table 1 and are the average of ten consecutive experiments.

TABLE 1

| Melamine cyanurate [wt %] | 7.5 | 10 | 12.5 | 15 |
|---|---|---|---|---|
| Burning time [s] | 42.3 | 37.3 | 36.2 | 39.3 |
| Weight ratio MeCy/talcum | 0.3 | 0.4 | 0.5 | 0.6 |

This example clearly shows that increasing the amount of melamine cyanurate to such extent that the weight ratio melamine cyanurate over talcum is higher than ⅓ in a composition comprising 25 wt % talcum, does not result in substantially shorter burning times.

The invention claimed is:
1. A polyamide composition comprising:
(A) polyamide,
(B) melamine cyanurate, and

(C) talcum, wherein
the talcum is present in an amount which is higher than 25 wt % based on total weight of the composition, and wherein
the melamine cyanurate is present in an amount to provide a weight ratio melamine cyanurate/talcum which is higher than ⅓, and wherein
the polyamide composition is halogen-free and passes a glow wire flammability index (GWFI) test conducted at 960° C. according to IEC 60695-2-12.

2. The polyamide composition according to claim 1, wherein the talcum is present in an amount of at least 30 wt %.

3. The polyamide composition according to claim 1, wherein the talcum and melamine cyanurate are present in a total amount of at most 50 wt %.

4. The polyamide composition according to claim 1, wherein the polyamide is chosen from polyamide 6 or polyamide 6,6.

5. The polyamide composition according to claim 1, wherein the polyamide is polyamide 6.

6. An article which at least partly comprises the polyamide composition according to claim 1.

7. An electrical or electronic part comprising the polyamide composition according to claim 1.

8. The electrical or electronic part according to claim 7 wherein the electrical or electronic part is a miniature circuit breaker.

\* \* \* \* \*